US005290385A

United States Patent [19]

Downing et al.

[11] Patent Number: 5,290,385

[45] Date of Patent: Mar. 1, 1994

[54] MULTIPLE SET PRESSURE SEALER ROLLERS

[75] Inventors: Richard S. Downing, Grand Island; Daniel F. Pustelnik, West Seneca, both of N.Y.

[73] Assignee: Moore Business Forms, Inc., Grand Island, N.Y.

[21] Appl. No.: 857,277

[22] Filed: Mar. 25, 1992

[51] Int. Cl.[5] .......... B32B 31/00

[52] U.S. Cl. .......... 156/350; 156/351; 156/357; 156/441.5; 156/555; 493/10

[58] Field of Search .......... 156/350, 351, 355, 357, 156/361, 441.5, 442.1, 442.2, 443, 517, 555, 556; 53/206; 493/10, 205, 206, 208

[56] References Cited

U.S. PATENT DOCUMENTS

| | | | |
|---|---|---|---|
| 3,749,631 | 7/1973 | Batchelder et al. | 156/350 |
| 4,343,129 | 8/1982 | Gunther, Jr. et al. | 53/206 |
| 4,684,433 | 8/1987 | Gohr | 156/517 |
| 4,744,553 | 5/1988 | Hirose | 271/186 X |
| 4,826,475 | 5/1989 | Eweryd | 493/206 X |
| 4,928,807 | 5/1990 | Averbach | 271/185 X |
| 4,932,188 | 6/1990 | Krasuski et al. | 53/64 |
| 4,967,899 | 11/1990 | Newsome | 271/185 X |
| 5,104,116 | 4/1992 | Pohjola | 271/185 |
| 5,133,828 | 7/1992 | Jacques | 156/555 |

FOREIGN PATENT DOCUMENTS

| | | |
|---|---|---|
| 1197155 | 11/1985 | Canada . |
| 0421565 | 4/1991 | European Pat. Off. . |

*Primary Examiner*—David A. Simmons
*Assistant Examiner*—James J. Engel, Jr.
*Attorney, Agent, or Firm*—Nixon & Vanderhye

[57] ABSTRACT

Pressure sealing of business forms is effected utilizing first and second sets of (preferably narrow-width) rollers forming first and second nips which provide a sealing force to business forms passing between them. The first set of rollers are rotatable about first and second axes, typically horizontal, while the second set of rollers are rotatable about third and fourth axes. The third and fourth axes are substantially perpendicular to the first and second axes, and may be horizontal or vertical. The first set is typically provided above the second set, and a conveyor may be provided for conveying forms which drop from the first set into operative association with the second set.

13 Claims, 2 Drawing Sheets

MULTIPLE SET PRESSURE SEALER ROLLERS

BACKGROUND AND SUMMARY OF THE INVENTION

In U.S. Pat. No. 5,133,828 the disclosure of which is hereby incorporated by reference herein, a reversible pressure sealer, and method of handling business forms utilizing a pressure sealer, are provided. The invention in that patent shows a set of reversible rollers which pass the business forms through them in a first direction, and then reverse and pass them in the second direction, opposite the first direction. The advantageous reversing rollers described in the above-mentioned patent are used in this invention, except that the rollers are located so that at least two perpendicular edges—and in the preferred form all four edges—of the business form may be conveniently sealed either manually or semi-automatically. This allows for higher speed action on business forms (that is producing more sealed business forms per minute), than for the arrangement in the above-identified patent, while still employing all the advantageous features thereof.

According to one aspect of the present invention, a method of handling business forms, each having at least first and second perpendicular strips of pressure sensitive adhesive of a predetermined width for affixing one part of each business form to another, is provided. The method utilizes a machine having a first set of rollers rotatable above parallel first and second axes, and having a second set of rollers rotatable above parallel third and fourth axes substantially perpendicular to the first and second axes, which rollers apply a sealing force at a nip. The method comprises the following steps: (a) Feeding a business form into operative association with the nip of the first set of rollers, with the first strip of adhesive aligned with the nip. (b) Rotating the first set of rollers so that the business form is driven through the nip in a first direction, a sealing force being applied by the first set of rollers to the predetermined width of adhesive of the first strip. (c) Just prior to the form being drive completely through the nip, stopping rotation of the first set of rollers, and reversing the direction of rotation thereof, so that the business form is driven through the nip in a second direction, opposite the first direction. (d) After the business form has been driven through the nip of the first set of rollers in the second direction, passing the form into operative association with the nip of the second set of rollers with the second strip of adhesive aligned with the nip. (e) Rotating the second set of rollers so that the business form is driven through the nip in a third direction, substantially perpendicular to the first and second directions, a sealing force being applied by the second set of rollers to the predetermined width of adhesive of the second strip. (f) Just prior to the form being driven completely through the nip, stopping the second set of rollers, and reversing the direction of rotation thereof so that the form is driven through the nip in a fourth direction, opposite the third direction. (g) After step (f), removing the form from association with the rollers.

There may also be the further step (h), between steps (c) and (d), of rotating the form 90 degrees about an axes parallel to the first and second axes; or, the form may be led without rotation from the first set of rollers to the second set of rollers between steps (c) and (d). Typically the rollers are narrow-width rollers which apply a sealing force only to the approximate area of the predetermined widths of adhesive. The first through fourth axes may be substantially horizontal, and a form may drop vertically downwardly between steps (c) and (d).

According to another aspect of the present invention, an apparatus for applying pressure to business forms to activate pressure sensitive adhesive associated with the forms is provided. The apparatus comprises the following elements: A first set of rollers rotatable about parallel first and second axes and biased together to form a first nip. First reversible drive means for driving at least one of the first set of rollers alternately clockwise and counterclockwise. First sensor means for sensing the position of a business form with respect to the first and second rollers. A second set of rollers rotatable about parallel third and fourth axes, and biased together to form a second nip. Second reversible drive means for driving at least the second set of rollers alternately clockwise and counterclockwise. Second sensor means for sensing the position of a business form with respect to the second set of rollers. The third and fourth axes being disposed substantially perpendicular to the first and second axes. And, control means connected to the first and second sensor means and the first and second reversible drive means for driving a business form sensed by the sensor means through the first nip in a first direction so that compression sealing force is applied thereto, and after the business form has passed almost completely through the first nip, in a second direction, reversing the first drive means to drive the business form through the first nip again in a second direction, opposite the first direction; then for driving a business form sensed by the second sensor and through the second nip in a third direction, so that a compression sealing force is applied thereto, and after the business form has passed almost completely through the second nip in a third direction, reversing the second drive means to drive the business form through the second nip again in a fourth direction, opposite the third direction.

All of the axes may be horizontal, or the first and second axes may be substantially horizontal, and the third and fourth axes substantially vertical. It is desirable to provide narrow-width rollers, although full-width rollers may be suitable under some circumstances. Also a conveyor may be associated with the second set of rollers for driving forms to the rollers in the third direction, and away from the rollers after discharge therefrom, in the fourth direction.

It is the primary object of the present invention to provide the effective, quick, pressure sealing of business forms. This and other aspects of the invention become clear from an inspection of the detailed description of the invention and from the appended claims.

DETAILED DESCRIPTION OF THE DRAWINGS

Figure 1:
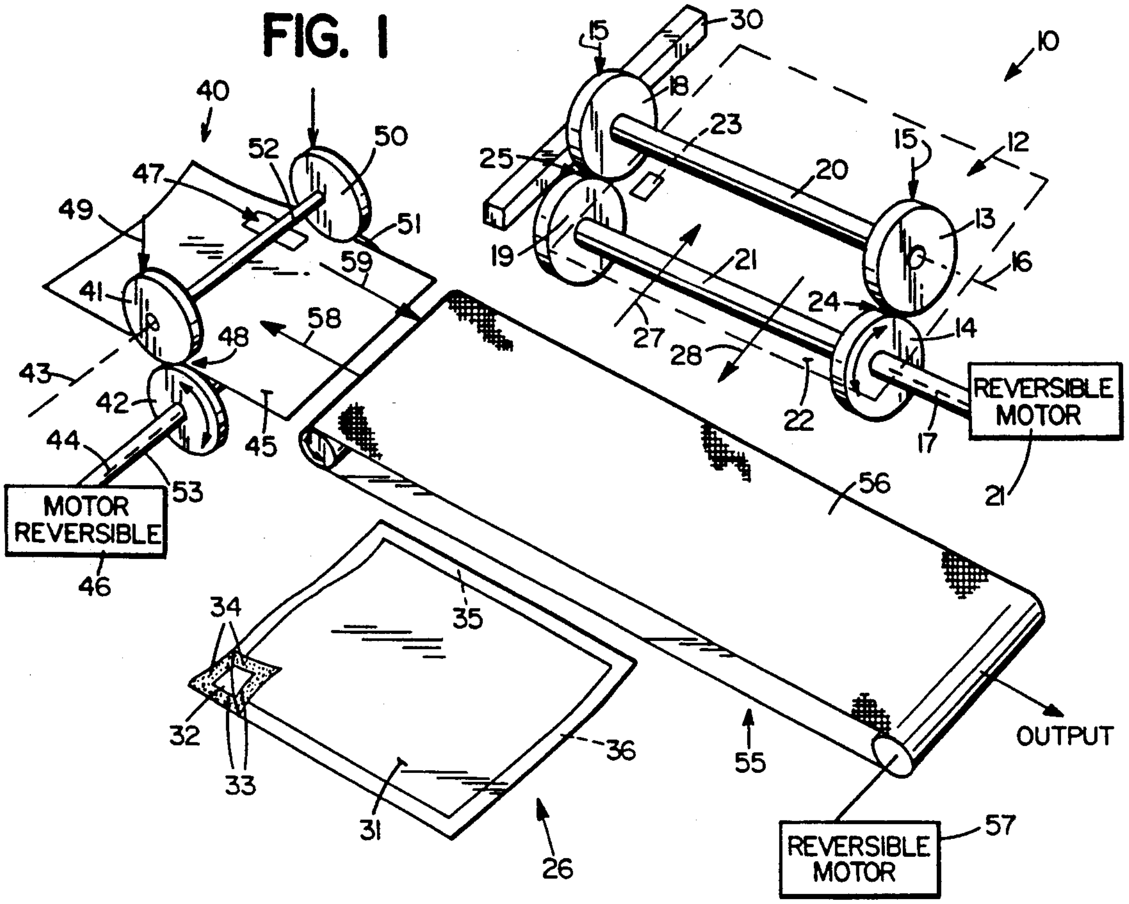
FIG. 1 is a perspective schematic view showing a first embodiment of the exemplary apparatus according to the present invention.

The apparatus according to the invention as illustrated in FIG. 1 comprises two sets of reversible rollers, with each individual set having the same basic components as in U.S Pat. No. 5,133,828 Ser. No. 07/787,405, filed Nov. 4, 1991, the disclosure of which has been incorporated by reference herein. Therefore, the details of the biasing means, mounting means, and other specific features of the apparatus will not be described, but rather reference is made to U.S. Pat. No. 5,133,828.

The exemplary apparatus 10 illustrated in FIG. 1 includes a first set of pressure seal rollers shown generally by reference numeral 12. Preferably, that first set of rollers 12 comprises first and second narrow-width rollers 13, 14, having the peripheries thereof engaging, and biased together by biasing means (shown only schematically by arrow 15, but typically comprising a spring), and rotatable about generally horizontal first and second axes, shown by reference numerals 16 and 17. While the first set 12 may only comprise two narrow-width rollers 13, 14, alternatively two full-length rollers could be provided, or—as illustrated in FIG. 1—third and fourth narrow-width rollers 18, 19 may be provided mounted on common shafts, 20, 21, for rotation, with the first and second rollers 13, 14, respectively, about the axes 16, 17, respectively.

The apparatus 12 also comprises a reversible drive means, such as a conventional motor 21, which is connected to at least one of the shafts 20, 21 (typically shaft 20), and effects alternate clockwise and counterclockwise rotation of the shaft 21, and therefore the rollers 14, 19. The rollers 14, 19, thus alternately effect counterclockwise and clockwise rotation, respectively, of the rollers 13, 18, which they engage.

Typically the first set of rollers 12 is associated with a business form support surface, shown by dotted line in FIG. 1, and by reference numeral 22, which has a first sensor means—also shown by dotted line—23 associated therewith. The sensor means 23 is mounted adjacent first nip 24 between the rollers 13, 14 and/or another nip 25 associated with rollers 18, 19. The sensor means 23 is described in U.S. Pat. No. 5,133,828, typically comprising two sensor elements adjacent each other, a first sensor element for initiating and controlling (with control means as in the application under Ser. No. 07/787,405) movement of business form 26 in a first direction 27 through the rollers 13, 14, and a second sensor element located closer to the nip 24 than the first sensor element for initiating and controlling driving the business form in a second direction 28 out from the rollers 13, 14, that is opposite the first direction 27. The sensors of the means 23 may be reflective sensors as in said application Ser. No. 07/787,405. In order to guide the business form 26, a guide rail 30 may also be associated with support surface 22.

The business form 26 typically comprises a top sheet 31 and a bottom sheet 32 and inserts may be provided therebetween. It may be a C fold product, Z fold product, U fold product, or other conventional product. For simplicity of illustration business form 26 is shown as a U fold product in FIG. 1.

Pressure sensitive adhesive strips are associated with the sheets 31, 32. For example, there are first strips 33, and second strips 34 perpendicular to the first strips 33. Strips comparable to the strips 33 on the opposite edge thereof are shown schematically at 35 on strips comparable to the strips 34 shown schematically at 36 in FIG. 1.

According to the present invention, a second set of pressure sealing rollers 40 is also provided. The rollers 40 are essentially identical to the rollers 12, including having fifth and sixth rollers 41, 42 rotatable about third and fourth axes 43, 44, a support structure 45 for business forms, a reversible drive motor 46, second sensor means 47, and a nip 48 between the peripheries of rollers 41, 42, which are biased together by biasing means 49. Again, the second set of rollers 40 preferably are narrow-width rollers, although full-width rollers can be provided and the second arrangement of narrow-width rollers 50, 51 may be provided mounted on common shafts 52, 53, with the rollers 41, 42.

The axes 43, 44 are essentially perpendicular to the axes 16, 17, and in this embodiment the axes 43, 44, are parallel to each other and essentially horizontal.

Note that the second set of rollers 40 is mounted vertically below the first set 12, and preferably some sort of conveyor means 55 is disposed beneath the nips 24, 25 (or just in front of them and moving in the direction 27), for receipt of a business form 26 once it drops downwardly after being expelled from the first set 12 in the direction 28. In the embodiment schematically illustrated in FIG. 1, the conveyor means 55 is shown as a conveyor belt 56 driven by conventional reversible motor 27 to feed business forms 26 to the nip 48 in a third direction 58, and then transport them away from the nip 48 in a fourth direction 59.

Figure 2:
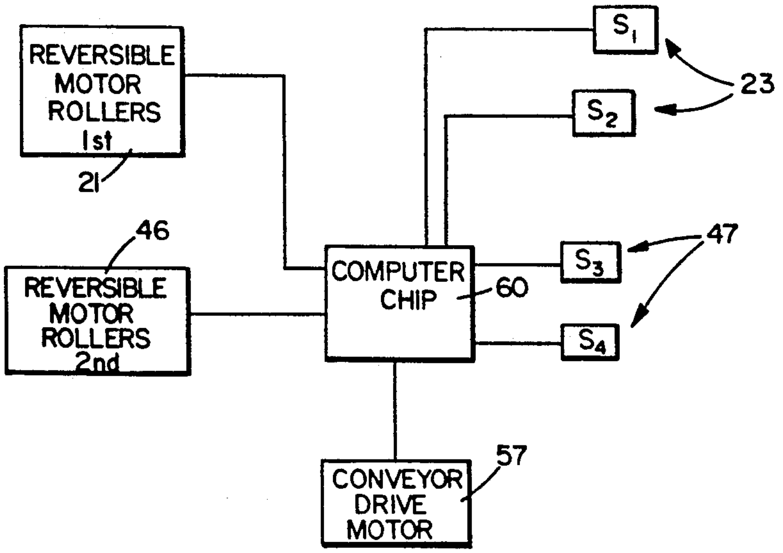
FIG. 2 is a control schematic of the apparatus of FIG. 1.

FIG. 2 diagramatically illustrates the interconnections between the control components of the apparatus 10 of FIG. 1. A computer chip 60 or the like comprises a control means connected to the sensors 23, 47 and reversible motors 21, 46, 57, for driving a business form 26 sensed by the sensor means 23,47 through the respective nips of the rollers, and after the business form has passed almost completely through the nip, in the reverse direction.

In this exemplary embodiment of the apparatus 10, business form 26 is manually moved in the first direction 27 so that the pressure sensitive adhesive strips 34, 36 are in alignment with rollers 13, 14, 18, 19 (which may automatically occur if the guide 30 is positioned properly). Once form 26 is sensed by the sensor 23, the computer chip 60 controls the drive motor 21 to drive the form 26 in the first direction 27 (typically supported by the support surface 22) through the nips 24, 25 so that a compressive force is provided to the adhesive strips 34, 36. After the business form 26 has passed almost completely through the nips 24, 25, in the direction 27, then the control means 60, initiated by the second sensor of the sensor means 23, reverses the motor 21 to drive the form 26 through the nips 24, 25 again in the second direction 28, sealing being enhanced by this action.

Once the form 26 is expelled from the first set of rollers 12, in the direction 28, it drops down onto the conveyor 56, which has been controlled by the motor 57, through the sensor means 23 (and possibly a timer), so that the form 26 is fed in the third direction 58 to the support surface 45 into the rollers 41, 42, 50, 51. The strips 33, 35 are engaged by the rollers 41, 42, 50, 51 and the sensor means 47 controls the motor 46 to drive the form 26 in the direction 58 through the nip 48, to effect pressure sealing of the strips 33, 35. Then the sensor 47 functions like the sensor 23 to control, with the computer chip 60, reverse direction of the motor 46 to expel the form 26 in the fourth direction 59, again, providing compressive sealing action, to discharge the business form 26 onto the conveyor 56, which has been controlled by the computer chip 60 so that the motor 57 thereof is reversed and the form 26 is entirely expelled from the apparatus 10 by the conveyor 56, in the fourth direction 59.

Figure 3:
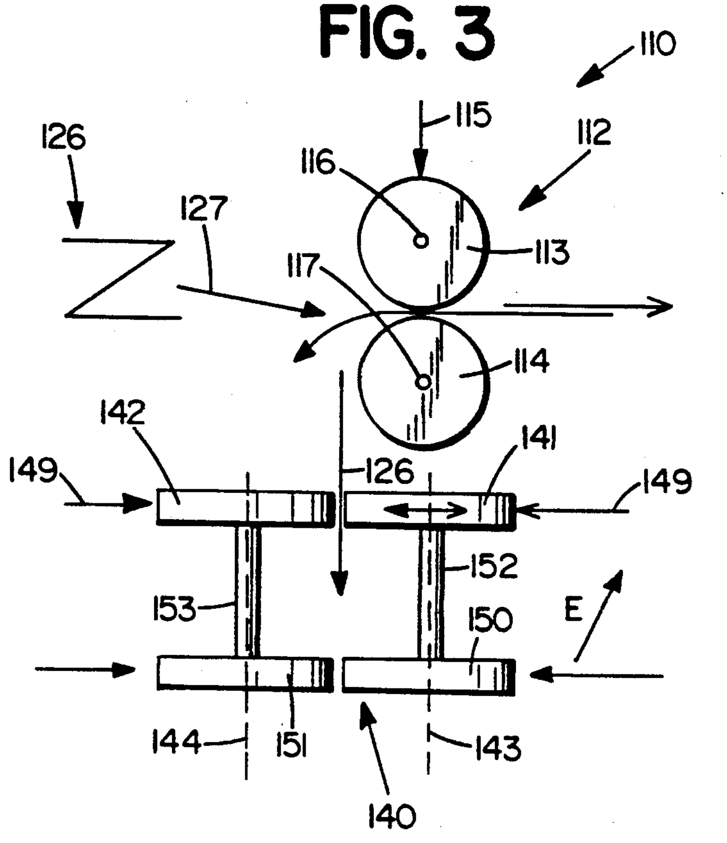
FIG. 3 is a schematic side view of a second form of apparatus according to the invention.
Figure 4:
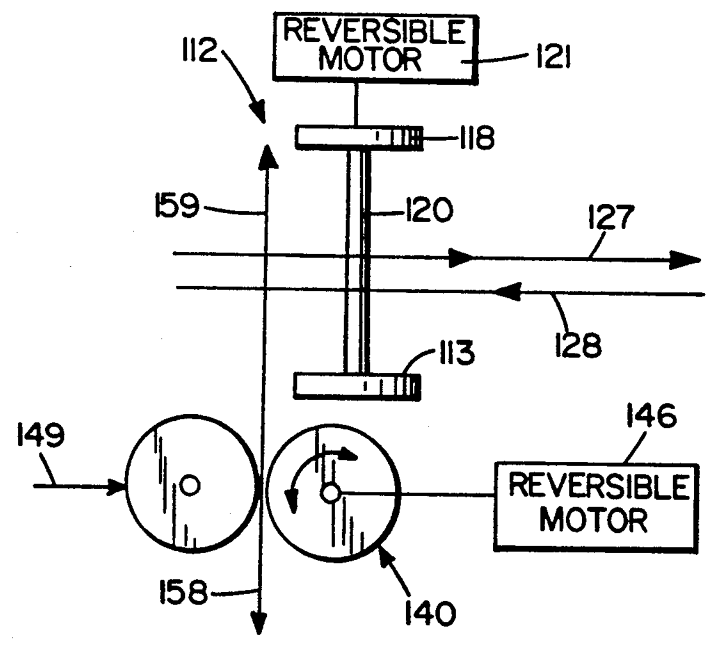
FIG. 4 is a schematic top view of the apparatus of FIG. 3.

FIGS. 3 and 4 illustrate another embodiment of the apparatus according to the present invention. In this embodiment, structures comparable to those in the FIG. 1 embodiment are illustrated by the same reference numeral, only preceded by a "1".

The major difference between the structure 110 and the structure 10 is the orientation of the axes of the second set of rollers. That is, while the axes 116, 117 are typically essentially horizontal, the axes 143, 144 are essentially vertical (parallel to each other and perpendicular to the axes 116, 117). When a form 126 is expelled and sent in direction 128 from the first set of rollers 112, the form rotates 90 degrees about an axis parallel to the axes 116 and 117, typically bending downwardly so that it moves into engagement with the rollers 141, 142, 150, 151 of the second set 140. The rollers 141, 142, 150, 151 are then controlled by the motor 146 to drive the form 126 in the third direction 158 and then in direction 159 and expelled therefrom.

The rollers 141, 142, 150, 151, typically are mounted so that they are spaced from each other until the form 126 drops into position in association therewith, then they are moved to clamp on the form, at which time the biasing force from the spring schematically illustrated at 149, provides sufficient pressure force. The rollers may be mounted for relative movement with respect to each other (that is, the axes 143, 144 moving toward and away from each other) by any suitable conventional means.

It will thus be seen that according the present invention, an effective method and apparatus for sealing business forms having pressure sensitive adhesive strips, are provided. While the method and apparatus are hereby shown and described in what is presently considered to be the most practical and preferred embodiment, it will be apparent to those of ordinary skill in the art that many modifications may be made thereof within the scope of the invention, which scope is to be accorded the broadest interpretation of the appended claim so as to encompass all equivalent structures and methods.

What is claimed is:

1. A pressure applying apparatus for applying pressure to business forms to activate pressure sensitive adhesive associated with the forms to seal one part of a form to another, comprising:

a first set of rollers rotatable about parallel first and second axes and biased together to form a first nip;

first reversible drive means for driving at least one of said rollers alternately clockwise and counterclockwise;

first sensor means for sensing the position of a business form with respect to said first and second rollers;

a second set of rollers rotatable about parallel third and fourth axes, and biased together to form a second nip;

second reversible drive means for driving at least said second set of rollers alternately clockwise and counterclockwise;

second sensor means for sensing the position of a business form with respect to said second set of rollers;

said third and fourth axes being disposed substantially perpendicular to said first and second axes, said first and second axes being substantially horizontal, and said third and fourth axes being substantially vertical; and control means connected to said first and second sensor means and said first and second reversible drive means for driving a business form sensed by said sensor means through said first nip in a first direction so that compression sealing force is applied thereto, and after the business form has passed almost completely through the first nip, in a second direction, reversing said first drive means to drive the business form through said first nip again in a second direction, opposite the first direction; then for driving a business form sensed by said second sensor and through said second nip in a third direction, so that compression sealing force is applied thereto, and after the business form has passed almost completely through said second nip in a third direction, reversing said second drive means to drive the business form through said second nip again in a fourth direction, opposite the third direction.

2. Apparatus as recited in claim 1 further comprising means for mounting said first set of rollers vertically above said second set of rollers.

3. Apparatus as recited in claim 2 further comprising conveyor means for conveying business forms discharged from said first set of rollers to a position whereby they may be conveyed by said second set of rollers.

4. Apparatus as recited in claim 3 wherein said conveyor means is controlled by a reversible motor, and wherein said control means controls said reversible motor to drive the business forms in the third and fourth directions.

5. Apparatus as recited in claim 1 wherein said first set of rollers comprises first and second narrow periphery rollers, the peripheries thereof engaging.

6. Apparatus as recited in claim 5 wherein said first set of rollers also comprises third and fourth narrow periphery rollers mounted on common axes with said first and second rollers, and having the peripheries thereof engaging.

7. Apparatus as recited in claim 6 wherein said second set of rollers comprises fifth and sixth narrow periphery rollers having the peripheries thereof engaging, and seventh and eighth narrow periphery rollers rotatable about the same axes as said fifth and sixth rollers and having the peripheries thereof engaging.

8. Apparatus as recited in claim 1 wherein said first sensor means comprising two sensor elements adjacent to each other, the first sensor element for initiating and controlling, with the control means, the drive of the business form in the first direction; and a second sensor element, located closer to said first nip and said first sensor element, for initiating and controlling, with the control means, the drive of the business form in the second direction.

9. Apparatus as recited in claim 8 wherein said second sensor means comprises two sensor elements substantially identical to said first and second sensor elements only associated with said second nip and for initiating and controlling, with said control means, driving of the business form in said third and fourth directions.

10. Apparatus as recited in claim 1 wherein said first and second axes are substantially horizontal, and said third and fourth axes are substantially vertical.

11. Apparatus as recited in claim 1 wherein said first roller axis is movably mounted, and said second roller axis is stationarily mounted, and wherein said first and second rollers are biased together by spring biasing means acting on said first roller which biases it into contact with said second roller, and wherein said reversible drive means is connected only to said second roller.

12. A pressure applying apparatus for applying pressure to business forms to activate pressure sensitive adhesive associated with the forms to seal one part of a form to another, comprising:

a first set of rollers rotatable about parallel first and second axes and biased together to form a first nip;

first reversible drive means for driving at least one of said rollers alternately clockwise and counterclockwise;

first sensor means for sensing the position of a business form with respect to said first and second rollers;

a second set of rollers rotatable about parallel third and fourth axes, and biased together to form a second nip;

second reversible drive means for driving at least said second set of rollers alternately clockwise and counterclockwise;

second sensor means for sensing the position of a business form with respect to said second set of rollers;

said third and fourth axes being disposed substantially perpendicular to said first and second axes;

control means connected to said first and second sensor means and said first and second reversible drive means for driving a business form sensed by said sensor means through said first nip in a first direction so that compression sealing force is applied thereto, and after the business form has passed almost completely through the first nip, in a second direction, reversing said first drive means to drive the business form through said first nip again in a second direction, opposite the first direction; then for driving a business form sensed by said second sensor and through said second nip in a third direction, so that compression sealing force is applied thereto, and after the business form has passed almost completely through said second nip in a third direction, reversing said second drive means to drive the business form through said second nip again in a fourth direction, opposite the third direction;

means for mounting said first set of rollers vertically above said second set of rollers; and conveyor means for conveying business forms discharged from said first set of rollers to a position whereby they may be conveyed by said second set of rollers, said conveyor means being controlled by a reversible motor; and wherein said control means controls said reversible motor to drive the business forms in the third and fourth directions.

13. Apparatus as recited in claim 12 wherein said first, second, third, and fourth axes are all substantially horizontal.

* * * * *